(12) United States Patent
Buttgenbach

(10) Patent No.: US 11,862,980 B1
(45) Date of Patent: Jan. 2, 2024

(54) AC OVERBUILD ADD-ON

(71) Applicant: 8ME NOVA, LLC, El Dorado Hills, CA (US)

(72) Inventor: Thomas Buttgenbach, Santa Monica, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 57 days.

(21) Appl. No.: 17/812,392

(22) Filed: Jul. 13, 2022

(51) Int. Cl.
*H02J 3/38* (2006.01)
*H02J 3/46* (2006.01)

(52) U.S. Cl.
CPC ............... *H02J 3/381* (2013.01); *H02J 3/46* (2013.01); *H02J 2300/24* (2020.01); *H02J 2300/28* (2020.01)

(58) Field of Classification Search
CPC .......... H02J 3/381; H02J 3/46; H02J 2300/24; H02J 2300/28
See application file for complete search history.

(56) References Cited

U.S. PATENT DOCUMENTS

| | | | | |
|---|---|---|---|---|
| 11,031,781 | B1* | 6/2021 | Zanone | H02J 3/381 |
| 2011/0276269 | A1 | 11/2011 | Hummel | |
| 2012/0249065 | A1 | 10/2012 | Bissonette et al. | |
| 2014/0200723 | A1 | 7/2014 | Roy et al. | |
| 2016/0124400 | A1 | 5/2016 | Kanayama et al. | |
| 2017/0047742 | A1 | 2/2017 | Narla | |
| 2017/0104337 | A1 | 4/2017 | Drees | |
| 2018/0331543 | A1* | 11/2018 | Palombini | H02J 3/381 |
| 2019/0079473 | A1* | 3/2019 | Kumar | H02J 3/381 |
| 2020/0005405 | A1 | 1/2020 | Cui et al. | |
| 2020/0021236 | A1 | 1/2020 | Pan et al. | |
| 2020/0259358 | A1 | 8/2020 | Hansen et al. | |
| 2022/0052525 | A1 | 2/2022 | Buttgenbach et al. | |
| 2022/0299424 | A1 | 9/2022 | Al-Muaili et al. | |

FOREIGN PATENT DOCUMENTS

JP          6017715 B1 * 11/2016

* cited by examiner

*Primary Examiner* — Charles Cai
(74) *Attorney, Agent, or Firm* — Foley & Lardner LLP

(57) ABSTRACT

An add-on renewable power plant (ARPP) may include a renewable energy source (RES) connected to a legacy renewable power plant (LRPP) interconnection infrastructure, where an output capacity of the RES is sized based on an LRPP transmission capacity and an LRPP power output profile, and an energy storage system (ESS) connected to the LRPP interconnection infrastructure, where a storage capacity of the ESS is sized based on the LRPP transmission capacity and the LRPP power output profile. The ARPP may also include a controller configured to control an ARPP output by controlling an RES output and an ESS charge/discharge such that a variability of an ARPP-LRPP combined power output has a lower variability than a variability of an LRPP output and control the ARPP output such that the ARPP-LRPP combined power output does not exceed a transmission capacity of the LRPP interconnection infrastructure.

20 Claims, 11 Drawing Sheets

AC OVERBUILD ADD-ON

BACKGROUND

A legacy renewable power plant (LRPP) has an interconnection infrastructure with a transmission capacity sized to match peak solar power output of the LRPP. The interconnection infrastructure may include a switchyard, a local substation, a gen-tie, and a point-of-interconnect (POI) substation. A typical LRPP has a low capacity factor, meaning that its average output is much lower than its peak output. This means that the transmission capacity of the interconnection infrastructure is unused most of the time when a power output of the LRPP is below peak levels.

SUMMARY

Aspects of the present disclosure include an add-on renewable power plant (ARPP). The ARPP may include a renewable energy source (RES) connected to a legacy renewable power plant (LRPP) interconnection infrastructure, where an output capacity of the RES is sized based on an LRPP transmission capacity and an LRPP power output profile. The ARPP may also include an energy storage system (ESS) connected to the LRPP interconnection infrastructure, where a storage capacity of the ESS is sized based on the LRPP transmission capacity and the LRPP power output profile. The ARPP may also include a controller configured to control an ARPP output by controlling an RES output and an ESS charge/discharge such that a variability of an ARPP-LRPP combined power output has a lower variability than a variability of an LRPP output and control the ARPP output such that the ARPP-LRPP combined power output does not exceed a transmission capacity of the LRPP interconnection infrastructure.

The controller of the ARPP may be further configured to track the ARPP power output and the LRPP power output.

The controller of the ARPP may be further configured to control the ARPP such that the ARPP power output complements the LRPP power output.

The ARPP may include an RES output capacity and an ESS storage capacity tuned based on the LRPP transmission capacity and the LRPP power output profile.

The ARPP may include an RES output capacity and an ESS storage capacity tuned such that the ARPP-LRPP combined power output is substantially equal to the transmission capacity of the LRPP interconnection infrastructure.

The ARPP may include an RES output capacity and an ESS storage capacity tuned such that the RES can charge the ESS with a sufficient amount of power such that the ESS can output an amount of power substantially equal to the transmission capacity of the LRPP interconnection infrastructure.

The controller of the ARPP may be further configured to track an ARPP-LRPP combined power output using a meter in a gen-tie of the interconnection infrastructure.

The ARPP may be connected to the LRPP interconnection infrastructure upstream of an LRPP transformer.

The ARPP may be connected to the LRPP interconnection infrastructure downstream of an LRPP transformer.

The ARPP may include an RES which is a solar array.

Aspects of the present disclosure include a method including determining a renewable energy source (RES) output capacity and an energy storage system (ESS) storage capacity based on a transmission capacity of an LRPP interconnection infrastructure and a power output profile of the LRPP. The may may also include constructing an add-on renewable power plant (ARPP) including an RES having the determined RES output capacity and an ESS having the determined ESS storage capacity, wherein the ARPP is configured to connect to the LRPP interconnection infrastructure.

The method may include tracking an ARPP power output and an LRPP power output.

The method may include controlling the ARPP such that an ARPP-LRPP combined power output does not exceed the transmission capacity of the LRPP interconnection infrastructure.

The method may include controlling the ARPP such that the ARPP power output complements the LRPP power output.

Within the method, the step of determining the RES output capacity and the ESS storage capacity may include determining the RES output capacity and the ESS storage capacity such that the ARPP-LRPP combined power output is substantially equal to the transmission capacity of the LRPP interconnection infrastructure.

The method may include tracking an ARPP-LRPP combined power output using a meter in a gen-tie of the interconnection infrastructure.

The method may be performed with an ARPP configured to connect to the LRPP interconnection infrastructure upstream of an LRPP transformer.

The method may be performed with an ARPP configured to connect to the LRPP interconnection infrastructure downstream of an LRPP transformer.

Within the method, the step of determining the RES output capacity includes determining a type of renewable energy utilized by the RES.

The method may include the LRPP being controlled independently of the ARPP.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present disclosure solve the technical problem of underutilized interconnection infrastructure. Legacy renewable power plants, (LRPPs) often have peak outputs that are much higher than their average output. Interconnection infrastructure, such as a gen-tie, connects an LRPP to a grid, such as a utility grid. The interconnection infrastructure must have a transmission capacity high enough to handle a peak output of the LRPP. The transmission capacity is, however, much higher than an average output of the LRPP. Stated otherwise, the LRPP has a low capacity factor. The transmission capacity is thus under-used most of the time. By adding an add-on renewable power plant (ARPP) to the interconnection infrastructure, the transmission capacity of the interconnection infrastructure can be more fully used more of the time.

Adding an ARPP to the interconnection infrastructure also solves the technical problem of reducing interconnection infrastructure requirements for a new power plant. A new interconnection infrastructure requires significant amounts of materials and may involve digging trenches or burying transmission lines for significant distances, often through land owned by third parties. Adding an ARPP to the interconnection infrastructure avoids these issues.

Figure 1:
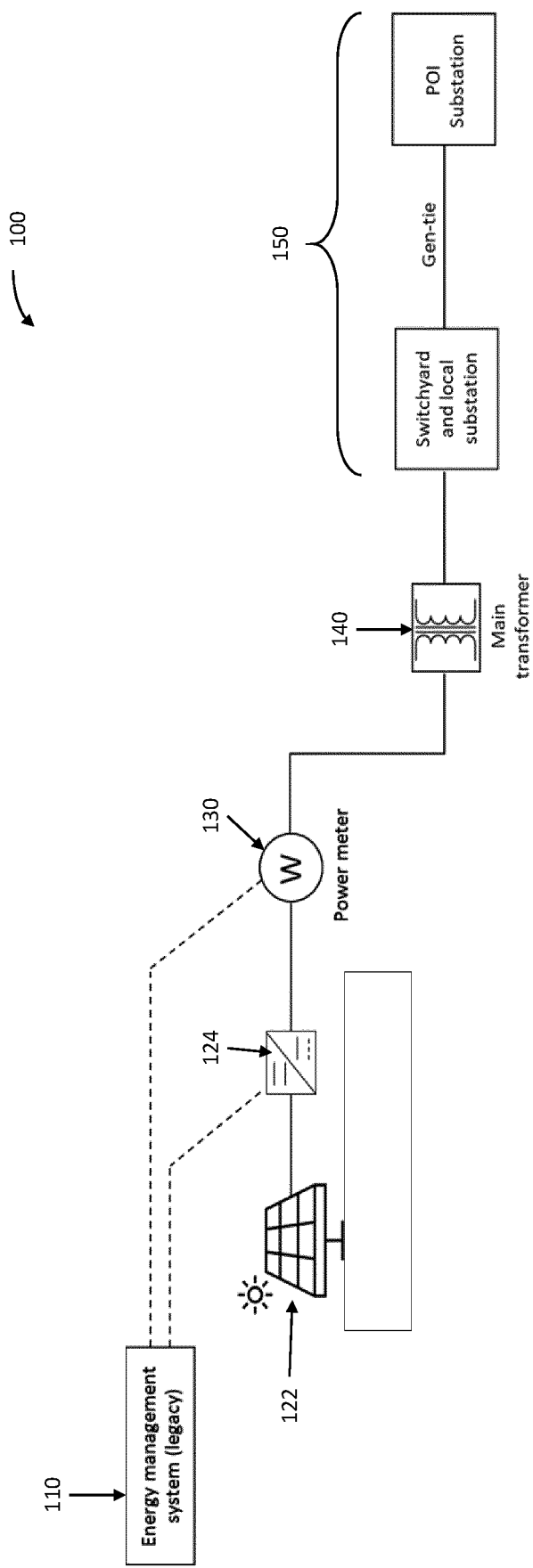
FIG. 1 is an example legacy renewable power plant (LRPP), in accordance with one or more embodiments.

FIG. 1 is an example legacy renewable power plant (LRPP) 100, in accordance with one or more embodiments. The LRPP may include a legacy energy management system (LEMS) 110. The LEMS 110 may be a controller. The LEMS 110 may send and receive signals from an inverter 124 and a power meter 130. The LRPP may include a renewable energy source (RES) 122. The RES 122 may be a solar array. The inverter 124 may convert DC power from the RES 122 to AC power. The inverter 124 may regulate an output of the RES 122 to control an LRPP output. The LEMS 110 may control the LRPP inverter 124 to control the LRPP output. The LEMS 110 may transmit setpoints to the LRPP inverter 124. The setpoints may be voltage setpoints, current setpoints, or real and/or reactive power setpoints. A setpoint is a command to an inverter to generate an output specified in the setpoint. The LRPP power meter 130 may provide feedback to the LEMS 110 for controlling the LRPP output.

The LRPP may include a transformer 140, and an interconnection infrastructure 150. The interconnection infrastructure may include a switchyard and local substation, a gen-tie, and a point-of-interconnect (POI) substation. The POI substation may connect to a grid, such as a utility grid. The transformer 140 may step up a voltage of the LRPP output for transmitting power through the interconnection infrastructure to the grid.

The LRPP may have a power output profile which shows how the LRPP output changes over an interval. The LRPP power output profile may be an average of the LRPP output for a plurality of intervals, a representative interval from the plurality of intervals, or a weighted average of the plurality of intervals. For example, the LRPP power output profile may show how the LRPP output changes over the course of a day. If the RES 122 is a solar array, the LRPP power output profile may show the LRPP output rise in the morning as the LRPP is exposed to more sunlight, peak at noon, and drop off through the afternoon and evening as the sun sets. In some embodiments, a peak LRPP output may be limited by a transmission capacity of the interconnection infrastructure 150. In other embodiments, the transmission capacity of the interconnection infrastructure 150 may be based on the peak LRPP output. In some embodiments, the transmission capacity is no more than 150% of the peak LRPP output. The peak LRPP output is higher than an average LRPP output. The transmission capacity of the interconnection infrastructure 150 may be underutilized. For example, if the RES 122 is a solar array, the peak LRPP output at noon may be much higher than the LRPP output in the morning and in the evening, meaning the transmission capacity of the interconnection infrastructure 150 is only fully used at noon and only partially used in the morning and the evening.

Figure 2:
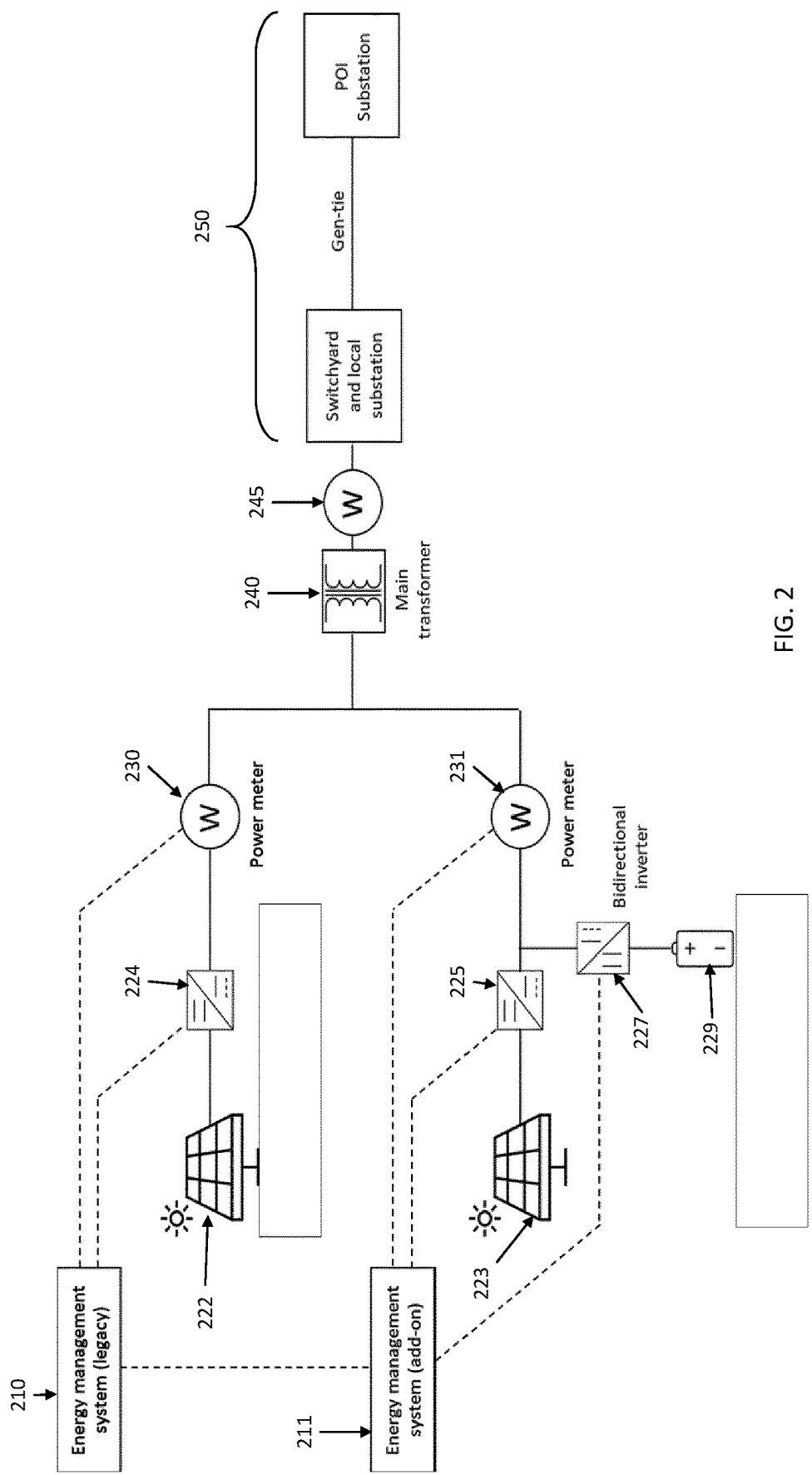
FIG. 2 is an example add-on renewable power plant (ARPP) connected to an interconnection infrastructure of an LRPP upstream of a transformer of the LRPP, in accordance with one or more embodiments.

FIG. 2 is an example add-on renewable power plant (ARPP) connected to an LRPP interconnection infrastructure 250 upstream of an LRPP transformer 240, in accordance with one or more embodiments.

The LRPP may be the LRPP of FIG. 1. The LRPP may include a legacy energy management system (LEMS) 210. The LEMS 210 may be or include a controller. The LEMS 210 may send and receive signals from an LRPP inverter 224 and an LRPP power meter 230. The LRPP may include an LRPP renewable energy source (RES) 222. The LRPP RES 222 may be a solar array. The LRPP may include a transformer 240, an interconnection infrastructure power meter 245, and an LRPP interconnection infrastructure 250. In some embodiments, the interconnection infrastructure power meter 245 may be in a gen-tie of the interconnection infrastructure. The interconnection infrastructure power meter 245 may be added to the LRPP interconnection infrastructure 250 when the ARPP is connected to the LRPP interconnection infrastructure 250. The LRPP interconnection infrastructure 250 may include a switchyard and local substation, the gen-tie, and a POI substation.

The LEMS 210 may control the LRPP inverter 224 to regulate an LRPP output. The LEMS 210 may transmit LRPP inverter setpoints to the LRPP inverter 224. The LRPP inverter setpoints may be voltage setpoints, current setpoints, or power setpoints. The LRPP power meter 230 may provide feedback to the LEMS 210 for controlling the LRPP output. The LRPP inverter 224 may convert DC power from the LRPP RES 222 to AC power.

The ARPP may include an add-on energy management system (AEMS) 211. The AEMS 211 may be a controller. The AEMS may send and receive signals from an RES inverter 225, an ARPP power meter 231, and an energy storage system (ESS) inverter 227. The AEMS 211 may send and receive signals from the LEMS 210. The signals from the LEMS 210 may include LRPP inverter setpoints for the LRPP inverter 224 and the LRPP power output, or an indication of the LRPP power output, as measured by the LRPP power meter 230. The AEMS 211 may transmit RES inverter setpoints to the RES inverter 225. The RES inverter setpoints may be voltage setpoints, current setpoints, or power setpoints. The AEMS may transmit ESS inverter setpoints to the ESS inverter 227. The ESS inverter setpoints may be voltage setpoints, current setpoints, or power setpoints. The ESS inverter 227 may be a bidirectional inverter. The ARPP may include an energy storage system (ESS) 229. The ARPP may include an ARPP RES 223. The ARPP RES 223 may be a solar array, wind farm, or any other type of RES. The ESS 229 may be a battery energy storage system or any other type of energy storage system.

The ESS 229 may be charged using power received from the ARPP RES 223. The ESS 229 may discharge to provide power to the transformer 240 through the ARPP power meter 231. The ESS inverter 227 may be configured to regulate a charge/discharge of the ESS 229. The ESS inverter 227 may convert AC power from the RES inverter 225 to DC power to charge the ESS 229. The ESS inverter 227 may convert DC power from the ESS 229 to AC power to be sent to the transformer 240. The AEMS 211 may control the RES inverter 225 and the ESS inverter 227 to regulate how much power is generated by the ARPP RES 223 and how much power is charged to the ESS 229 or discharged from the ESS 229 in order to control an ARPP output. The AEMS 211 may control the RES inverter 225 and the ESS 227 by adjusting setpoints of the RES inverter 225 and the ESS 227. The ARPP power meter 231 may measure the ARPP output and provide feedback to the AEMS 211 for controlling the ARPP output. The feedback to the AEMS 211 may be used to control the ARPP output in a closed-loop control system such that the measured output power of the ARPP is equal to the lesser of a power level based on a power sale agreement or on profitability based on current and expected market pricing for energy, or the difference between the transmission capacity and the LRPP output.

The combined LRPP output and ARPP output may be received by the transformer 240. The transformer 240 may step up the combined output for transmission through the LRPP interconnection infrastructure 250. The interconnection infrastructure power meter 245 may measure an amount of power transmitted through the LRPP interconnection infrastructure 250.

The LRPP may have a power output profile which shows how the LRPP output changes over a time period. For example, the LRPP power output profile may show how the LRPP output changes over the course of a day. If the LRPP RES 222 is a solar array, the LRPP power output profile may show the LRPP output rise in the morning as the LRPP is exposed to more sunlight, peak at noon, and drop off through the afternoon and evening as the sun sets. In some embodiments, a peak LRPP output may be limited by a transmission capacity of the LRPP interconnection infrastructure 250. In other embodiments, the transmission capacity of the LRPP interconnection infrastructure 250 may be based on the peak LRPP output. In some embodiments, the transmission capacity is no more than 150% of the peak LRPP output. The peak LRPP output is higher than an average LRPP output. The transmission capacity of the LRPP interconnection infrastructure 250 may be underutilized. For example, if the RES 122 is a solar array, the peak LRPP output at noon may be much higher than the LRPP output in the morning and in the evening, meaning the transmission capacity of the LRPP interconnection infrastructure 250 is only fully used at noon and only partially used in the morning and the evening.

In some embodiments, an output capacity of the ARPP RES 223 may be sized based on an LRPP transmission capacity of the LRPP interconnection infrastructure. In some embodiments, the ARPP RES output capacity may be sized to be equal to the LRPP interconnection infrastructure transmission capacity. In other embodiments, the ARPP RES output capacity may be sized such that the ARPP RES 223 may output sufficient power to fully utilize the LRPP transmission capacity. In yet other embodiments, the ARPP RES output capacity may be sized such that the ARPP RES 223 may output sufficient power, when combined with the LRPP RES output and the ESS output, to fully utilize the LRPP transmission capacity. The ARPP RES output capacity may be sized such that the ARPP RES 223 may output sufficient power, when combined with the LRPP RES output and the ESS output, to complement the LRPP power output profile to fully utilize the LRPP transmission capacity.

A storage capacity of the ESS 229 may be based on the interconnection infrastructure transmission capacity and the LRPP power output profile. For example, the ARPP RES output capacity may be sized and the ESS storage capacity may be sized such that the ARPP RES 223 outputs sufficient power and the ESS 229 stores and/or outputs sufficient power to complement the LRPP power output profile to fully utilize the LRPP transmission capacity. In another example, The ARPP RES output capacity may be sized and the ESS storage capacity may be sized such that the ARPP RES 223 outputs sufficient power to complement the LRPP power output profile and charge the ESS 229 so the ESS 229 can output sufficient power to complement the LRPP power output profile to fully utilize the LRPP transmission capacity. The ESS storage capacity is sized to be able to store the ARPP RES output and provide stored power to complement the LRPP power output profile to fully utilize the LRPP transmission capacity. In this example, the ARPP RES 223 may output sufficient power to complement the LRPP power output profile to fully utilize the LRPP transmission capacity and charge the ESS with sufficient power such that when the ARPP RES 223 does not output sufficient power to complement the LRPP power output profile, the ESS 229 may output sufficient power to complement the LRPP power output. In this example, the ARPP RES 223 may be a solar array which produces power during daylight hours and charges the ESS 229. Before and after daylight hours when the ARPP RES 223 is not producing power, the ESS 229 may provide stored power to complement the LRPP power output profile.

In some embodiments, the ARPP RES 223 and ESS 229 are sized together based on the LRPP transmission capacity and the LRPP power output profile. The ARPP RES 223 and ESS 229 may be sized such that an ARPP-LRPP combined power output is substantially equal to the LRPP transmission capacity for a target interval. The target interval may be based on the LRPP power output profile. For example, the LRPP power output profile may show the LRPP power output for a day. The target interval may be a portion of the day or the entire day, in which case the ARPP-LRPP combined power output will always be substantially equal to the LRPP transmission capacity. The ARPP RES 223 may be sized to produce an amount of power equal to the LRPP transmission capacity for the target interval minus an amount of power produced by the LRPP RES 222 as shown in the LRPP power output profile. The ESS 229 may be sized to store power generated by the ARPP RES 223 and output the stored power such that the ARPP-LRPP combined output is substantially equal to the LRPP transmission capacity.

In some embodiments, the AEMS 221 is configured to control the ARPP output such that a variability of the ARPP-LRPP combined output has a lower variability than a variability of the LRPP output. Variability of an output is a measure of how much individual values of the output differ from a moving average of the output or from an expected pattern. In the case of variability of the LRPP output, the pattern may be the LRPP power output profile based on historic LRPP outputs. The pattern may be a pattern of how the LRPP output changes through a day. The AEMS 211 may control the ARPP RES output and the ESS charge/discharge to control the ARPP output. The AEMS 211 may track the ARPP power output using the ARPP power meter 231 and track the LRPP power output using the LRPP power meter 230. In some embodiments, the ARPP power meter 231 and the LRPP power meter 230 continuously transmit an instantaneous ARPP output and instantaneous LRPP output to the AEMS 211. In other embodiments, the AEMS 211 polls the ARPP power meter 231 and the LRPP power meter 230 at periodic intervals for the instantaneous ARPP output and the instantaneous LRPP output. In yet other embodiments, the AEMS 211 polls the ARPP power meter 231 and the LRPP power meter 230 at periodic intervals for a moving average of the ARPP output and a moving average of the LRPP output. The variability of the LRPP output may be determined in real-time and/or based on the LRPP power output profile. In some embodiments, the variability of the LRPP output may be determined by comparing measured LRPP output values to the LRPP power output profile based on historic LRPP outputs. In other embodiments, the variability of the LRPP output may be determined by comparing measured LRPP output values to a moving average of measured LRPP output values. In yet other embodiments, the variability of the LRPP output may be determined by comparing measured LRPP output values to a set of ideal LRPP output values. The set of ideal LRPP output values may be determined based on a representative or ideal irradiance values and the conversion efficiency of the LRPP. The set of ideal LRPP output values may be equal to the LRPP power output profile. The AEMS 211 may regulate the ARPP output and/or the ESS charge/discharge based on the variability of the LRPP output such that the ARPP-LRPP combined output has a lower variability than a variability of the LRPP output. By lowering the variability of the ARPP-LRPP combined output, the ARPP functions as a firming plant for the LRPP.

In some embodiments, the AEMS 211 is configured to control the ARPP output such that the ARPP-LRPP combined output does not exceed the LRPP transmission capacity. The LRPP output and/or the ARPP-LRPP output may be determined in real time. The AEMS 211 may regulate the ARPP output and/or the ESS charge/discharge based on the LRPP output such that the ARPP-LRPP combined output does not exceed the LRPP transmission capacity. The AEMS 211 may track the ARPP power output using the ARPP power meter 231 and track the LRPP power output using the LRPP power meter 230. The AEMS 211 may track the ARPP-LRPP combined power output using the interconnection infrastructure power meter 245. The AEMS 211 may control the ARPP such that an instantaneous sum of the ARPP output, as measured at the ARPP power meter 331, and the LRPP output, as measured at the LRPP power meter 330, does not exceed a maximum permitted power flow at the point-of-interconnect (POI) to the grid. The AEMS 211 may control the ARPP output according to a power sale agreement and/or based on current and expected market pricing for power while ensuring that the ARPP-LRPP combined output does not exceed the LRPP transmission capacity. In some embodiments, the AEMS 211 may control the ARPP such that a rate of change of the ARPP-LRPP combined power output does not exceed an allowed rate of change at the POI. The AEMS 211 may calculate a rate of change of the ARPP-LRPP output as change in the ARPP-LRPP output over time. The AEMS 211 may compare the rate of change of the ARPP-LRPP output and compare it to a maximum ramp-down rate (e.g., a stored maximum ramp-down rate) and a maximum ramp-up rate (e.g., a stored maximum ramp-up rate) of the POI. The AEMS 211 may control the ARPP output such that a ramp-down rate of the ARPP-LRPP combined power output does not exceed the maximum ramp-down rate and that a ramp-up rate of the ARPP-LRPP combined power output does not exceed the maximum ramp-up rate. Avoiding exceeding the maximum ramp-down and ramp-up rates of the POI avoids causing harm to the grid and violating agreements with the utility organization operating the grid.

In some embodiments, the AEMS 211 and the LEMS 210 may transmit inverter setpoints of the ARPP and the LRPP to a shared energy management system. The shared energy management system may resolve conflicts arising from independently set inverter setpoints of the ARPP and the LRPP. If the sum of the ARPP output and the LRPP output exceeds the LRPP interconnection infrastructure transmission capacity, the shared energy management system may send a signal to the AEMS 211 to reduce the ARPP output. The inverter setpoints of the ARPP and the LRPP may be sent to the shared energy management system for approval by the AEMS 211 and the LEMS 210 before being applied to inverters of the ARPP and the LRPP. The shared energy management system may compare the ARPP output and the LRPP output such that the ARPP output complements the LRPP output. The shared energy management system may receive inverter setpoints of the ARPP and the LRPP, calculate a combined output based on the received inverter setpoints, compare the combined output to a target output, and adjust the inverter setpoints of the ARPP so the combined output is equal to the target output. The shared energy management system may determine inverter setpoints for inverters of the ARPP and the LRPP based on the transmission capacity, an instantaneous LRPP output, and an instantaneous ARPP output. The shared energy management system may set the ARPP output to be equal to the transmission capacity minus the LRPP output. The shared energy management system controls the ARPP output such that the ARPP output does not exceed the transmission capacity minus the LRPP output.

Figure 3:
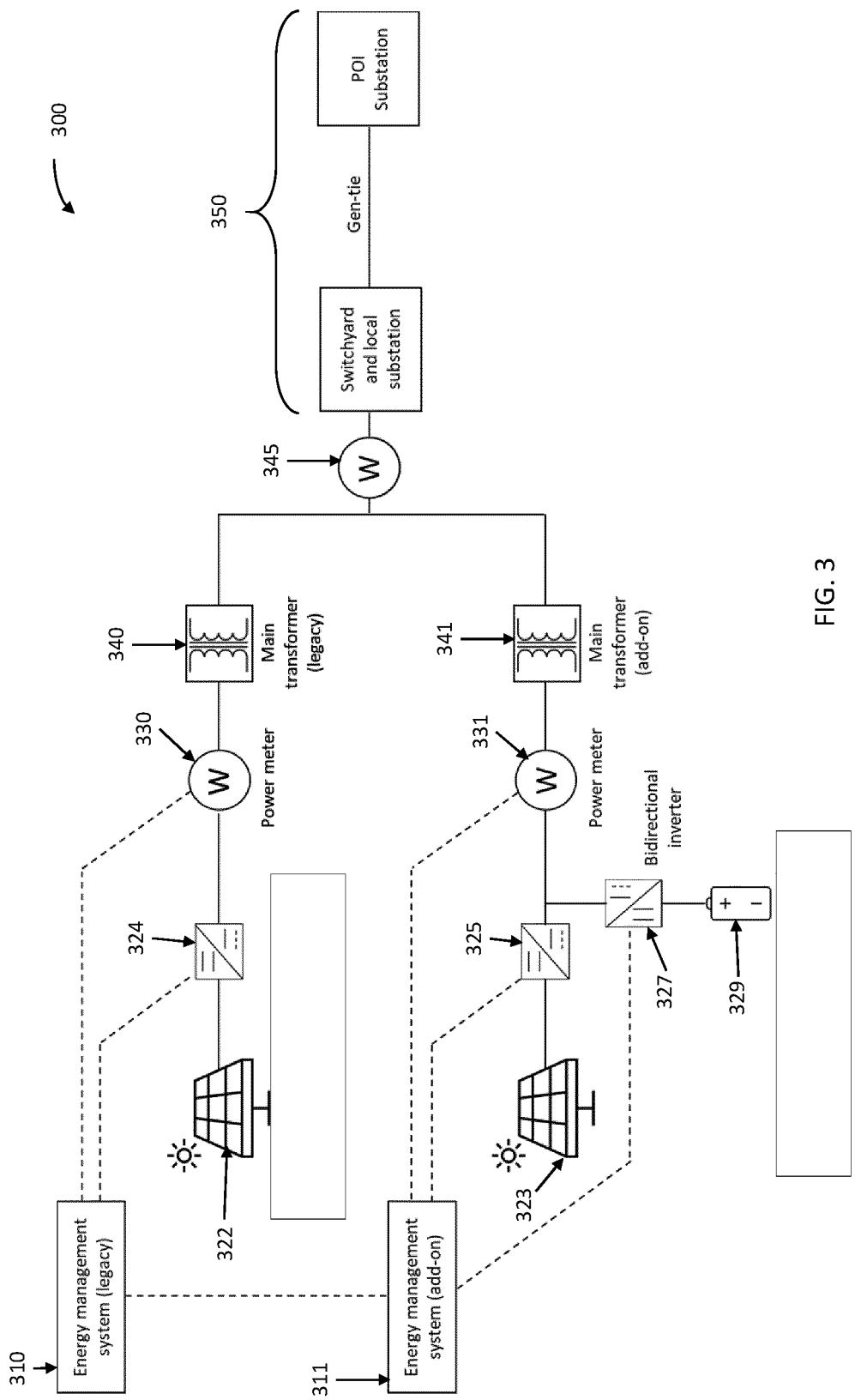
FIG. 3 is an example add-on renewable power plant (ARPP) connected to an interconnection infrastructure of an LRPP downstream of a transformer of the interconnection infrastructure, in accordance with one or more embodiments.

FIG. 3 is an example add-on renewable power plant (ARPP) connected to an interconnection infrastructure of an LRPP downstream of an LRPP transformer 340, in accordance with one or more embodiments.

The LRPP may include a legacy energy management system (LEMS) 310. The LEMS 310 may be a controller. The LEMS 310 may send and receive signals from an LRPP inverter 324 and an LRPP power meter 330. The LRPP may include an LRPP renewable energy source (RES) 322. The LRPP RES 322 may be a solar array. The LRPP may include an LRPP RES inverter 324. The LEMS 310 may adjust setpoints of the LRPP RES inverter 324 to control an LRPP RES output. A setpoint is a command to an inverter to generate an output specified in the setpoint. The LRPP may include an LRPP transformer 340, an interconnection infrastructure power meter 345, and an LRPP interconnection infrastructure 350. In some embodiments, the interconnection infrastructure power meter 345 may be in a gen-tie of the interconnection infrastructure. The interconnection infrastructure power meter 345 may be added to the LRPP interconnection infrastructure 350 when the ARPP is connected to the LRPP interconnection infrastructure 350. The LRPP interconnection infrastructure 350 may include a switchyard and local substation, the gen-tie, and a POI substation.

The ARPP may include an add-on energy management system (AEMS) 311. The AEMS 311 may be a controller.

The AEMS may send and receive signals from an RES inverter 325, an ARPP power meter 331, and an energy storage system (ESS) inverter 327. The AEMS 311 may send and receive signals from the LEMS 310. The signals from the LEMS 310 may include LRPP inverter setpoints for the LRPP inverter 324 and the LRPP power output, or an indication of the LRPP power output, as measured by the LRPP power meter 330. The AEMS 311 may transmit RES inverter setpoints to the ARPP RES inverter 325. The RES inverter setpoints may be voltage setpoints, current setpoints, or power setpoints. The AEMS may transmit ESS inverter setpoints to the ESS inverter 327. The ESS inverter setpoints may be voltage setpoints, current setpoints, or power setpoints. The ESS inverter 327 may be a bidirectional inverter. The ARPP may include an energy storage system (ESS) 329. The ARPP may include an ARPP RES 323. The ARPP RES 323 may be a solar array, wind farm, or any other type of RES. The ESS 229 may be a battery energy storage system or any other type of energy storage system.

The LEMS 310 may control the LRPP inverter 324 to regulate an LRPP output. The LEMS 310 may transmit LRPP inverter setpoints to the LRPP inverter 324. The LRPP inverter setpoints may be voltage setpoints, current setpoints, or power setpoints. The LRPP power meter 330 may provide feedback to the LEMS 310 for controlling the LRPP output. The LRPP inverter 324 may convert DC power from the LRPP RES 322 to AC power. The LRPP transformer 340 may step up the LRPP output for transmission through the LRPP interconnection infrastructure 350. The interconnection infrastructure power meter 345 may measure an amount of power transmitted through the LRPP interconnection infrastructure 350.

The ESS 329 may be charged using power received from the ARPP RES 323. The ESS 329 may discharge to provide power to the ARPP transformer 341 through the ARPP power meter 331. The ESS inverter 327 may be configured to regulate a charge/discharge of the ESS 329. The ESS inverter 327 may convert AC power from the ARPP RES inverter 325 to DC power to charge the ESS 329. The ESS inverter 327 may convert DC power from the ESS 329 to AC power to be sent to the ARPP transformer 341. The AEMS 311 may control the ARPP RES inverter 325 and the ESS inverter 327 to regulate how much power is generated by the ARPP RES 323 and how much power is charged to the ESS 329 or discharged from the ESS 329 in order to control an ARPP output. The ARPP power meter 331 may measure the ARPP output and provide feedback to the AEMS 311 for controlling the ARPP output. The ARPP transformer 341 may step up the ARPP output for transmission through the LRPP interconnection infrastructure 350. The interconnection infrastructure power meter 345 may measure an amount of power transmitted through the LRPP interconnection infrastructure 350. The feedback to the AEMS 311 may be used to control the ARPP output in a closed-loop control system such that the measured output power of the ARPP remains equal to the lesser of a power level based on a power sale agreement or on profitability based on current and expected market pricing for energy, or the difference between the transmission capacity and the LRPP output.

The LRPP may have a power output profile which shows how the LRPP output changes over a time period. For example, the LRPP power output profile may show how the LRPP output changes over the course of a day. If the LRPP RES 322 is a solar array, the LRPP power output profile may show the LRPP output rise in the morning as the LRPP is exposed to more sunlight, peak at noon, and drop off through the afternoon and evening as the sun sets. In some embodiments, a peak LRPP output may be limited by a transmission capacity of the LRPP interconnection infrastructure 350. In other embodiments, the transmission capacity of the LRPP interconnection infrastructure 350 may be based on the peak LRPP output. In some embodiments, the transmission capacity is no more than 150% of the peak LRPP output. The peak LRPP output is higher than an average LRPP output. The transmission capacity of the LRPP interconnection infrastructure 350 may be underutilized. For example, if the RES 132 is a solar array, the peak LRPP output at noon may be much higher than the LRPP output in the morning and in the evening, meaning the transmission capacity of the LRPP interconnection infrastructure 350 is only fully used at noon and only partially used in the morning and the evening.

In some embodiments, an output capacity of the ARPP RES 323 may be sized based on an LRPP transmission capacity of the LRPP interconnection infrastructure. In some embodiments, the ARPP RES output capacity may be sized to be equal to the LRPP interconnection infrastructure transmission capacity. In other embodiments, the ARPP RES output capacity may be sized such that the ARPP RES 323 may output sufficient power to fully utilize the LRPP transmission capacity. In yet other embodiments, the ARPP RES output capacity may be sized such that the ARPP RES 323 may output sufficient power, when combined with the LRPP RES output and the ESS output, to fully utilize the LRPP transmission capacity. The ARPP RES output capacity may be sized such that the ARPP RES 323 may output sufficient power, when combined with the LRPP RES output and the ESS output, to complement the LRPP power output profile to fully utilize the LRPP transmission capacity.

A storage capacity of the ESS 329 may be based on the interconnection infrastructure transmission capacity and the LRPP power output profile. For example, the ARPP RES output capacity may be sized and the ESS storage capacity may be sized such that the ARPP RES 323 outputs sufficient power and the ESS 329 stores and/or outputs sufficient power to complement the LRPP power output profile to fully utilize the LRPP transmission capacity. In another example, The ARPP RES output capacity may be sized and the ESS storage capacity may be sized such that the ARPP RES 323 outputs sufficient power to complement the LRPP power output profile and charge the ESS 329 so the ESS 329 can output sufficient power to complement the LRPP power output profile to fully utilize the LRPP transmission capacity. The ESS storage capacity is sized to be able to store the ARPP RES output and provide stored power to complement the LRPP power output profile to fully utilize the LRPP transmission capacity. In this example, the ARPP RES 323 may output sufficient power to complement the LRPP power output profile to fully utilize the LRPP transmission capacity and charge the ESS with sufficient power such that when the ARPP RES 323 does not output sufficient power to complement the LRPP power output profile, the ESS 329 may output sufficient power to complement the LRPP power output. In this example, the ARPP RES 323 may be a solar array which produces power during daylight hours and charges the ESS 329. Before and after daylight hours when the ARPP RES 323 is not producing power, the ESS 329 may provide stored power to complement the LRPP power output profile.

In some embodiments, the ARPP RES 323 and ESS 329 are sized together based on the LRPP transmission capacity and the LRPP power output profile. The ARPP RES 323 and ESS 329 may be sized such that an ARPP-LRPP combined power output is substantially equal to the LRPP transmission capacity for a target interval. The target interval may be based on the LRPP power output profile. For example, the LRPP power output profile may show the LRPP power output for a day. The target interval may be a portion of the day or the entire day, in which case the ARPP-LRPP combined power output will always be substantially equal to the LRPP transmission capacity. The ARPP RES 323 may be sized to produce an amount of power equal to the LRPP transmission capacity for the target interval minus an amount of power produced by the LRPP RES 322 as shown in the LRPP power output profile. The ESS 329 may be sized to store power generated by the ARPP RES 323 and output the stored power such that the ARPP-LRPP combined output is substantially equal to the LRPP transmission capacity.

In some embodiments, the AEMS 321 is configured to control the ARPP output such that a variability of the ARPP-LRPP combined output has a lower variability than a variability of the LRPP output. Variability of an output is a measure of how much individual values of the output differ from a moving average of the output or from a pattern associated with the output. The AEMS 321 may control the ARPP output to counteract the variability of the LRPP output. For example, if the LRPP is a solar array and clouds pass in front of the solar array causing a temporary drop in LRPP output, the AEMS 311 may raise the ARPP output to adjust for the temporary drop in LRPP output. With the increased ARPP output balancing out the temporary drop in LRPP output, the ARPP-LRPP combined output can remain steady and thus have less variability than the LRPP output.

The AEMS 311 may control the ARPP RES output and the ESS charge/discharge to control the ARPP output. The AEMS 311 may track the ARPP power output using the ARPP power meter 331 and track the LRPP power output using the LRPP power meter 330. The variability of the LRPP output may be determined in real-time by the LEMS 310 using the tracked LRPP power output from the LRPP power meter 330. In some embodiments, an expected variability of the LRPP output may be determined based on historic LRPP output data and/or the LRPP power output profile, where the LRPP power output profile is an representation of an average LRPP output. The AEMS 311 may regulate the ARPP output and/or the ESS charge/discharge based on the variability of the LRPP output such that the ARPP-LRPP combined output has a lower variability than a variability of the LRPP output. The AEMS 311 may adjust inverter setpoints for the ARPP RES inverter 325 and the ESS inverter 327 to control the ARPP RES 323 and the ESS 329. The AEMS 311 may receive feedback from the LRPP power meter 330 to determine the LRPP output variability and control the ARPP RES 323 ESS 329 to counteract the LRPP output variability. The AEMS 311 may receive feedback from the interconnection infrastructure power meter 345 to monitor the ARPP-LRPP combined output variability.

In some embodiments, the AEMS 311 is configured to control the ARPP output such that the ARPP-LRPP combined output does not exceed the LRPP interconnection infrastructure transmission capacity. The LRPP output and/or the ARPP-LRPP output may be determined in real time. The AEMS 311 may regulate the ARPP output and/or the ESS charge/discharge based on the LRPP output such that the ARPP-LRPP combined output does not exceed the LRPP transmission capacity. The AEMS 311 may track the ARPP power output using the ARPP power meter 331 and track the LRPP power output using the LRPP power meter 330. The AEMS 311 may track the ARPP-LRPP combined power output using the interconnection infrastructure power meter 345. The AEMS 311 may control the ARPP such that the instantaneous sum of the ARPP output and the LRPP output does not exceed a maximum permitted power flow at the point-of-interconnect (POI) to the grid. The AEMS 311 may control the ARPP output according to a power sale agreement and/or based on current and expected market pricing for power while ensuring that the ARPP-LRPP combined output does not exceed the LRPP transmission capacity. In some embodiments, the AEMS 311 may control the ARPP such that a rate of change of the ARPP-LRPP combined power output does not exceed an allowed rate of change at the POI. The AEMS 311 may control the ARPP such that a ramp-down rate of the ARPP-LRPP combined power output does not exceed a maximum ramp-down rate and that a ramp-up rate of the ARPP-LRPP combined power output does not exceed a maximum ramp-up rate.

In some embodiments, the AEMS 311 and the LEMS 310 may transmit inverter setpoints of the ARPP and the LRPP to a shared energy management system. The shared energy management system may resolve conflicts arising from independently set inverter setpoints of the ARPP and the LRPP. If the sum of the ARPP output and the LRPP output exceeds the LRPP interconnection infrastructure transmission capacity, the shared energy management system may send a signal to the AEMS 311 to reduce the ARPP output. The inverter setpoints of the ARPP and the LRPP may be sent to the shared energy management system for approval by the AEMS 311 and the LEMS 310 before being applied to inverters of the ARPP and the LRPP. The shared energy management system may compare the ARPP output and the LRPP output such that the ARPP output complements the LRPP output. The shared energy management system may receive inverter setpoints of the ARPP and the LRPP, calculate a combined output based on the received inverter setpoints, compare the combined output to a target output, and adjust the inverter setpoints of the ARPP so the combined output is equal to the target output. The shared energy management system may determine inverter setpoints for inverters of the ARPP and the LRPP based on the transmission capacity, an instantaneous LRPP output, and an instantaneous ARPP output. The shared energy management system may set the ARPP output to be equal to the transmission capacity minus the LRPP output. The shared energy management system may control the ARPP such that the ARPP output does not exceed the transmission capacity minus the LRPP output.

Figure 4:
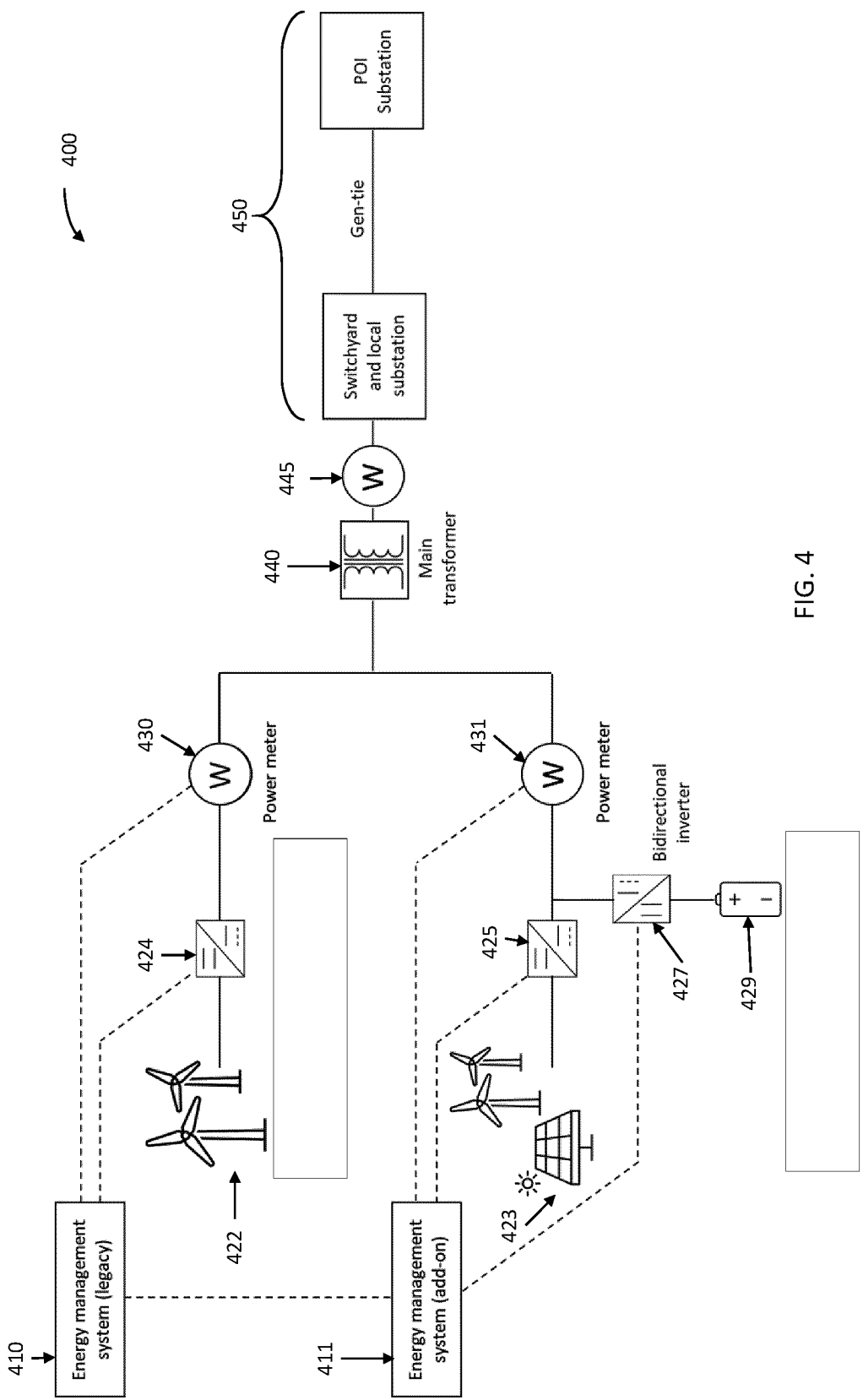
FIG. 4 is an example add-on renewable power plant (ARPP) connected to an interconnection infrastructure of an LRPP upstream of a transformer of the interconnection infrastructure, where the ARPP is a wind farm, in accordance with one or more embodiments.

FIG. 4 is an example ARPP connected to an interconnection infrastructure of an LRPP upstream of a transformer of the interconnection infrastructure, where the ARPP is a wind farm, in accordance with one or more embodiments. FIG. 4 shows the example ARPP of FIG. 2, wherein the LRPP RES 422 is a wind farm and the ARPP RES is a combination wind/solar farm. Although FIG. 2 shows the LRPP RES 222 as a solar array and the ARPP RES 223 as a solar array, the LRPP RES 222 and ARPP RES 223 may be any RES, including, but not limited to, a wind farm, a solar farm, a geothermal plant, a biofuel plant, a tidal force generator, a hydroelectric generator, or any combination of RESs.

Figure 5:
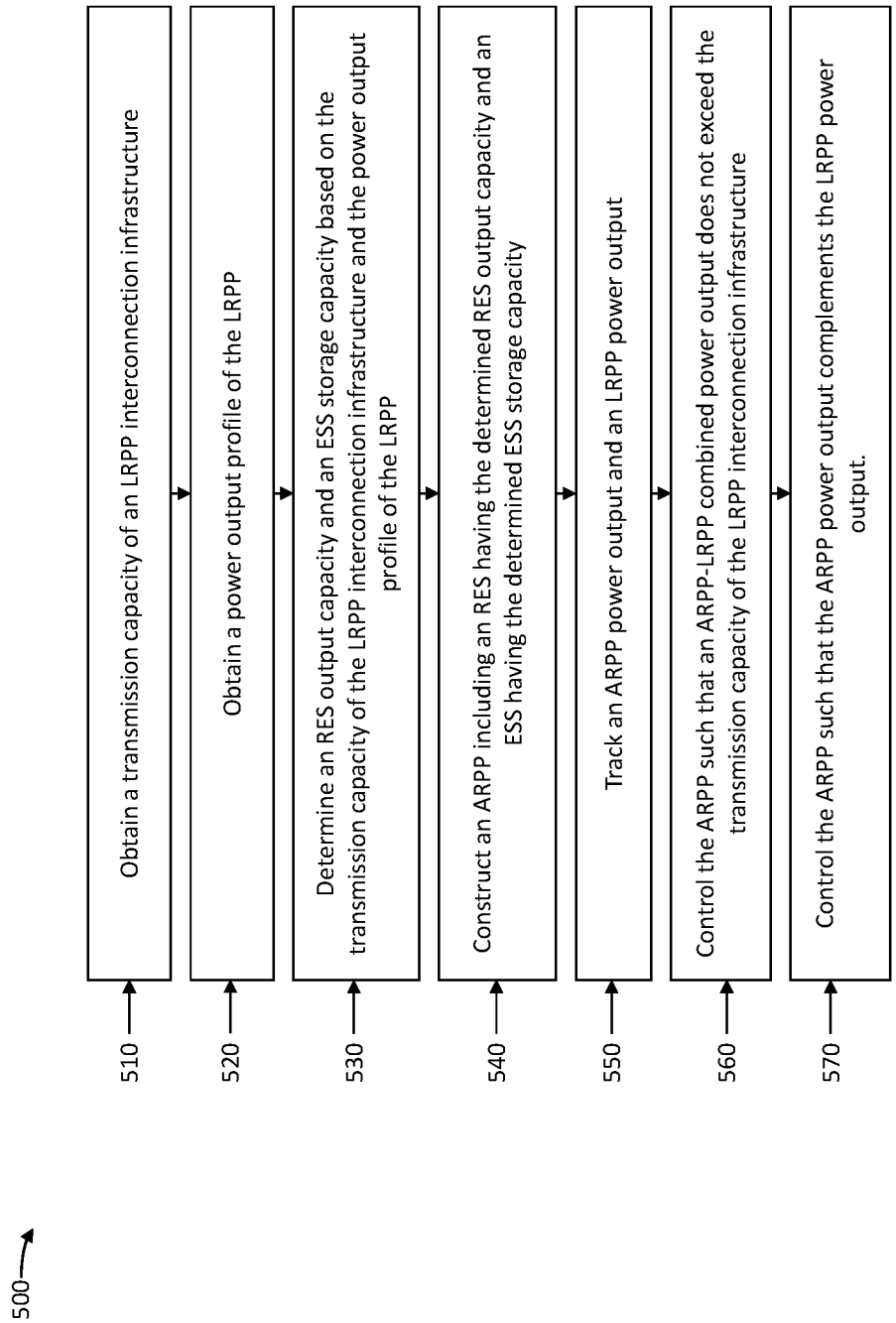
FIG. 5 is an example flowchart illustrating operations for constructing and controlling an ARPP, in accordance with one or more embodiments.

FIG. 5 is an example flowchart 500 illustrating operations for constructing and controlling an ARPP, in accordance with one or more embodiments. Additional, fewer, or different operations may be performed in the method, depending on the embodiment. Further, the operations may be performed in the order shown, concurrently, or in a different order.

At 510, a transmission capacity of an interconnection infrastructure of a legacy renewable power plant (LRPP) is obtained. The interconnection infrastructure may include a switchyard and local substation, a gen-tie, and a point-of-interconnect (POI) substation. The transmission capacity may be equal to a lowest transmission capacity of transmission capacities of components of the interconnection infrastructure.

At 520, a power output profile of the LRPP is obtained. In some embodiments, the LRPP power output profile is based on historic data. The LRPP power output profile may be an average of the LRPP output for a plurality of intervals, a representative interval from the plurality of intervals, or a weighted average of the plurality of intervals. For example, the LRPP power output profile may show how the LRPP output changes, on average, over the course of a day. In another example, the LRPP power output profile may show how the LRPP power output has changed historically over the course of a day having certain characteristics, such as time of year, weather forecast, or other characteristics.

In other embodiments, the LRPP power output profile is based on a forecast of the LRPP power output. The LRPP power output forecast may be based on irradiance data, weather forecasts, a configuration of the LRPP such as placement of solar arrays, and/or a conversion efficiency of the LRPP. The LRPP power output forecast may be updated based on updated data such as updated forecasts.

At 530, a renewable energy source (RES) output capacity and an energy storage system (ESS) storage capacity are determined based on the transmission capacity of the LRPP interconnection infrastructure and the power output profile of the LRPP. The RES output capacity and the ESS storage capacity may be determined such that a combined output of the RES, the ESS, and the LRPP are substantially equal to the transmission capacity. The RES output capacity and the ESS storage capacity may be determined such that a combined output of the RES, the ESS, and the LRPP are substantially equal to the transmission capacity for a predetermined interval. For example, the LRPP may be a solar array having a power output profile spanning a day with a maximum output at noon equal to the transmission capacity, but with outputs at other times of day much lower than the transmission capacity. The RES output capacity and the ESS storage capacity may be determined such that the RES can output enough power, and the ESS can store enough power such that the combined power output of the RES, ESS, and LRPP is equal to the transmission capacity all day long. In another example, the RES output capacity and the ESS storage capacity may be determined such that the RES can output enough power, and the ESS can store enough power such that the combined power output of the RES, ESS, and LRPP is equal to the transmission capacity for as long as the LRPP produces power.

At 540, an add-on renewable power plant (ARPP) is constructed including an RES having the determined RES output capacity and an ESS having the determined ESS storage capacity. The ARPP is added on to the LRPP, such that the ARPP connects to the LRPP interconnection infrastructure. The output of the RES and the ESS may be an ARPP output. The ARPP may be constructed in an added-on state or constructed near the LRPP and then connected when completed. The ARPP may be constructed with safety factors for the RES output capacity and the ESS storage capacity such that the combined output of the ARPP and LRPP is substantially equal to the transmission capacity despite fluctuations in the output of the RES and the LRPP.

At 550, a controller of the ARPP tracks an ARPP power output and the LRPP output. The ARPP controller may track the ARPP output by tracking an RES output and an ESS charge/discharge or by tracking the ARPP output directly using a meter. The ARPP controller may track the LRPP output using a meter. The ARPP controller may track the RES output, the ESS charge/discharge, and the LRPP output by tracking inverter setpoints of inverters connected to the RES, the ESS, and the LRPP.

At 560, the ARPP controller controls the ARPP such that an ARPP-LRPP combined power output does not exceed the transmission capacity of the LRPP interconnection infrastructure. Controlling the ARPP may include controlling inverter setpoints of an RES inverter and an ESS inverter. The RES inverter may control the RES output and the ESS inverter may control the ESS charge/discharge. The LRPP may produce an amount of power and the ARPP controller may react to the amount of power such that the ARPP-LRPP combined power output does not exceed the transmission capacity of the LRPP interconnection infrastructure. The ARPP controller may control the ARPP such that the instantaneous sum of the ARPP output and the LRPP output does not exceed a maximum permitted power flow at the point-of-interconnect (POI) to the grid. In some embodiments, the ARPP controller may control the ARPP such that a rate of change of the ARPP-LRPP combined power output does not exceed an allowed rate of change at the POI. The ARPP controller may control the ARPP such that a ramp-down rate of the ARPP-LRPP combined power output does not exceed a maximum ramp-down rate and that a ramp-up rate of the ARPP-LRPP combined power output does not exceed a maximum ramp-up rate.

At 570, the ARPP controller controls the ARPP such that the ARPP power output complements the LRPP power output. The LRPP may produce an amount of power and the ARPP controller may react to the amount of power to complement the amount of power. For example, if the LRPP power output dips such that an ARPP-LRPP combined power output is no longer equal to the transmission capacity, the ARPP controller may control the ARPP such that the ARPP output increases to make the ARPP-LRPP combined output equal to the transmission capacity.

Figure 6:
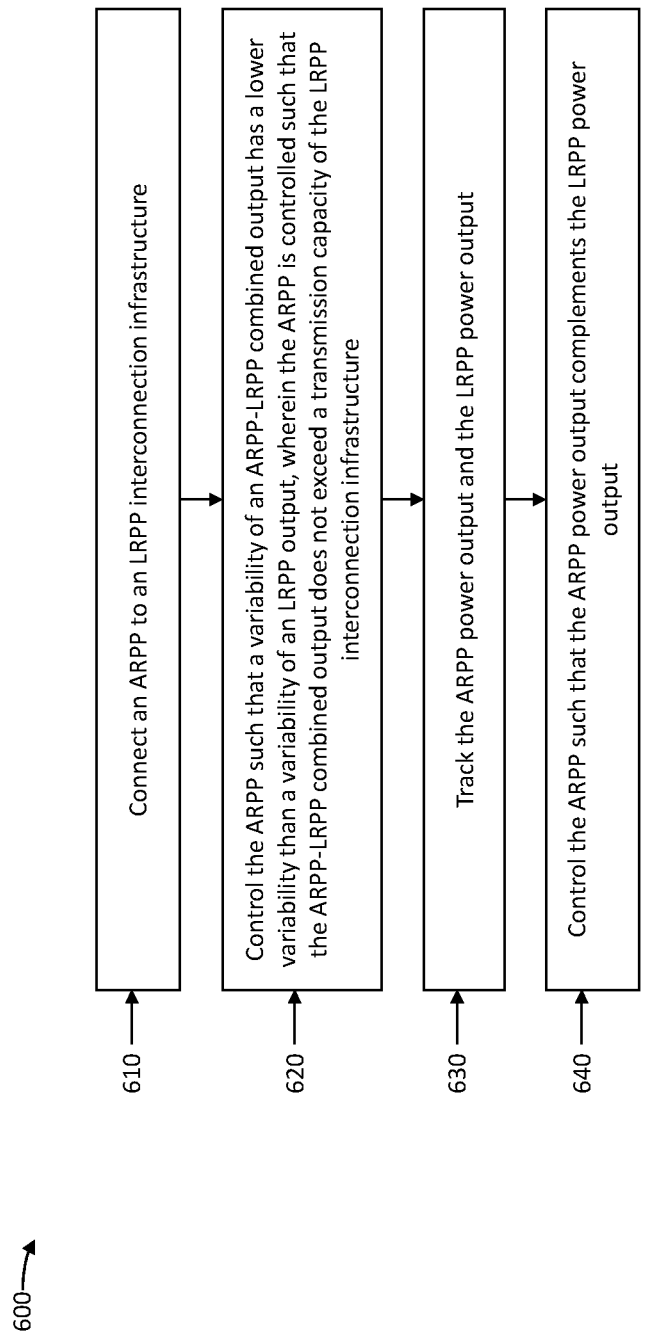
FIG. 6 is an example flowchart illustrating operations for connecting an ARPP to an interconnection infrastructure of an LRPP and controlling the ARPP, in accordance with one or more embodiments.

FIG. 6 is an example flowchart 600 illustrating operations for connecting an ARPP to an interconnection infrastructure of an LRPP and controlling the ARPP, in accordance with one or more embodiments. Additional, fewer, or different operations may be performed in the method, depending on the embodiment. Further, the operations may be performed in the order shown, concurrently, or in a different order.

At 610, an ARPP is connected to an LRPP interconnection infrastructure. The ARPP may include an RES and an ESS sized based on the LRPP interconnection infrastructure transmission capacity and the LRPP power output profile, as described herein. The ARPP may be constructed near the LRPP to be connected to the LRPP interconnection infrastructure or may be in a remote location and connected via a transmission line.

At 620, the ARPP controller controls the ARPP such that a variability of the ARPP-LRPP combined output has a lower variability than the variability of the LRPP output, wherein the ARPP is controlled such that the ARPP-LRPP combined output does not exceed a transmission capacity of the LRPP interconnection infrastructure. The LRPP may produce an amount of power and the ARPP controller may react to the amount of power such that the ARPP-LRPP combined power output does not exceed the transmission capacity of the LRPP interconnection infrastructure. The ARPP controller may react by changing setpoints of the RES inverter and/or the ESS inverter.

At 630, the ARPP controller tracks the ARPP power output and the LRPP power output. The ARPP controller tracks the ARPP power output and the LRPP power output using meters measuring the power outputs of the ARPP and LRPP and/or by monitoring setpoints of inverters of the ARPP and LRPP.

At 640, the ARPP controller controls the ARPP such that the ARPP power output complements the LRPP power output. The LRPP may produce an amount of power and the ARPP controller may react to the amount of power to complement the amount of power. For example, if the LRPP power output dips such that an ARPP-LRPP combined power output is no longer equal to the transmission capacity, the ARPP controller may control the ARPP such that the ARPP output increases to make the ARPP-LRPP combined output equal to the transmission capacity.

Figure 7:
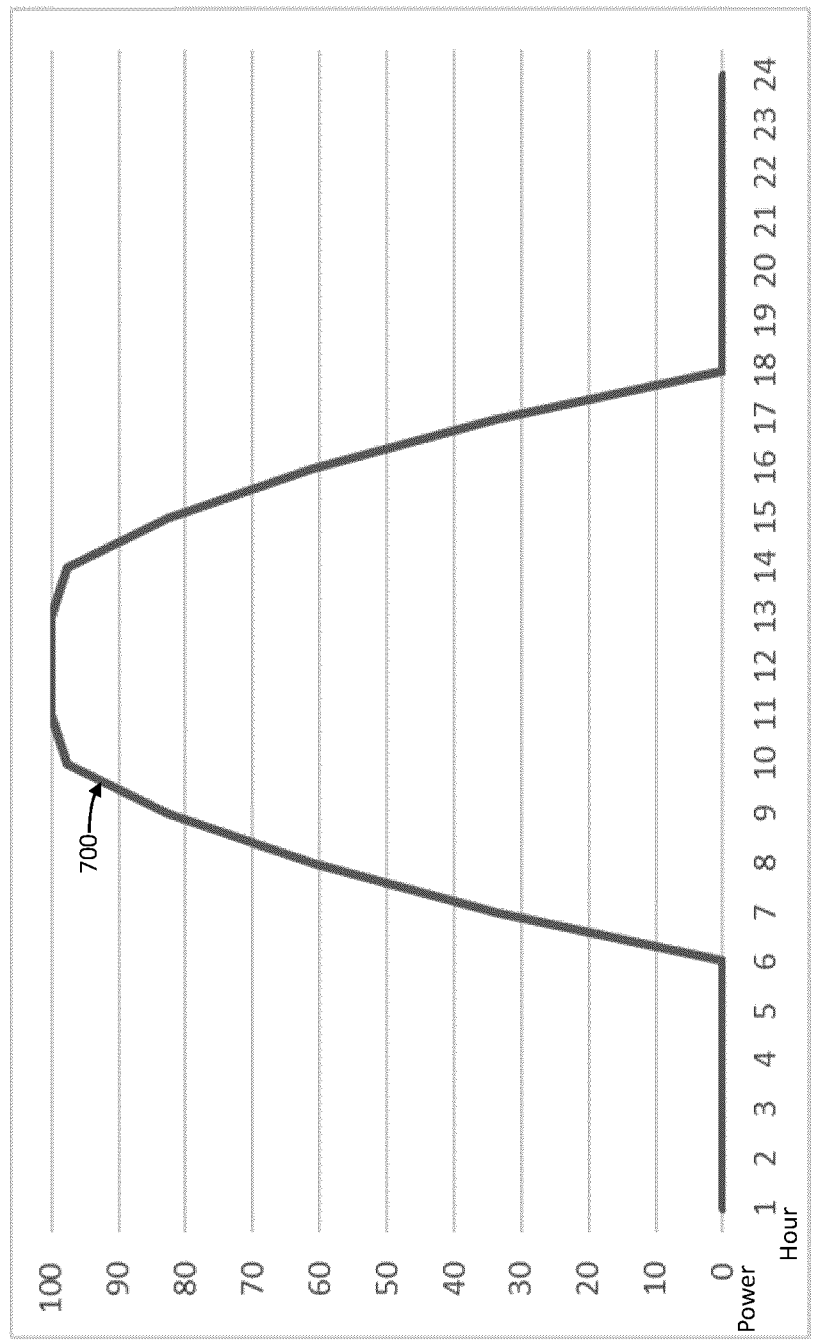
FIG. 7 is an example output of an example LRPP, in accordance with one or more embodiments.

FIG. 7 is an example output 700 of an example LRPP, in accordance with one or more embodiments. The "hour" axis may denote hours in a day. The "power" axis may denote output as a percentage of the LRPP interconnection infrastructure transmission capacity. The output 700 may be a power output profile 700 of the LRPP. The output 700 may be an LRPP power output profile showing a weighted average of multiple days of output or a representative day of output. The LRPP may be a solar array. The output 700 may be zero until sunrise, when the solar array begins to produce power. The output 700 may rise until it reaches the transmission capacity or an output capacity of the LRPP, at which point it flattens. The output 700 may fall in the afternoon until it reaches zero around sunset. The output 700 is zero at night until the following morning.

Figure 8:
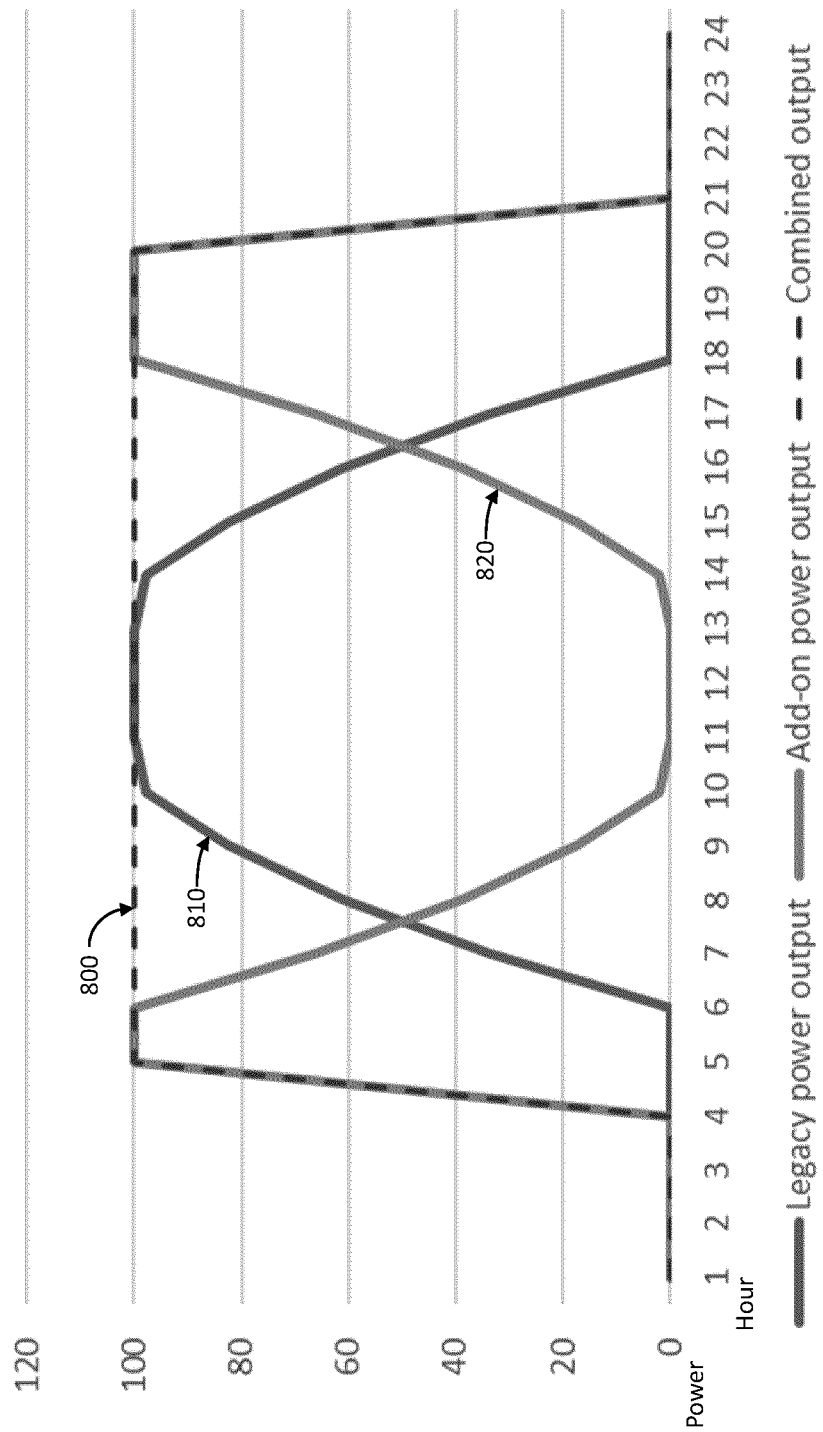
FIG. 8 is an example combined output of an example ARPP and an example LRPP, in accordance with one or more embodiments.

FIG. 8 is an example combined output 800 of an example ARPP and an example LRPP, in accordance with one or more embodiments. The "hour" axis may denote hours in a day. The "power" axis may denote output as a percentage of the LRPP interconnection infrastructure transmission capacity. The combined output 800 may be a combination of an LRPP output 810 and an ARPP output 820. The LRPP output 810 may be the LRPP output 700 of FIG. 7. FIG. 8 may show a combined output 900 for the ARPP and LRPP of FIGS. 2-4.

The ARPP output 820 may complement the LRPP output 810 such that the combined output 800 is consistent and smooth. The ARPP output 820 may be the output of an ARPP RES and ARPP ESS, where the ARPP ESS is configured to store power produced by the ARPP RES and output the stored power. The ARPP output is the sum of the ARPP RES output and the ARPP ESS charge/discharge. The ARPP RES may be a solar array with an output similar to the LRPP output 810. The ARPP ESS may store the ARPP RES output for later use. Around noon, when the LRPP output 810 is equal to the transmission capacity, the entirety of the ARPP RES output is available to charge the ARPP ESS and the ARPP output 820 may be zero. The ARPP RES output is either being directed to the grid as ARPP output 820, being used to charge the ARPP ESS, split between the grid and the ARPP ESS, or being curtailed. Energy stored in the ARPP ESS may be discharged to the grid as needed.

The ARPP RES and ARPP ESS may be tuned to complement the LRPP output 810. The ARPP RES and ARPP ESS may be tuned to complement the LRPP output 810 such that the combined output 800 provides consistent power for a time interval such as from 4:00 to 21:00. The ARPP RES may be tuned to have an output capacity equal to the LRPP transmission capacity for the time interval minus the LRPP output 810 for the time interval. The ARPP ESS may be tuned to store the power equal to the ARPP RES output capacity for the time interval minus the ARPP output 820 for the time interval. The tuned ARPP RES and ARPP ESS may be able to produce and store sufficient power to provide the ARPP output 820 for the time interval to complement the LRPP output 810 for the time interval such that the combined output 800 is consistent for the time interval.

Figure 9:
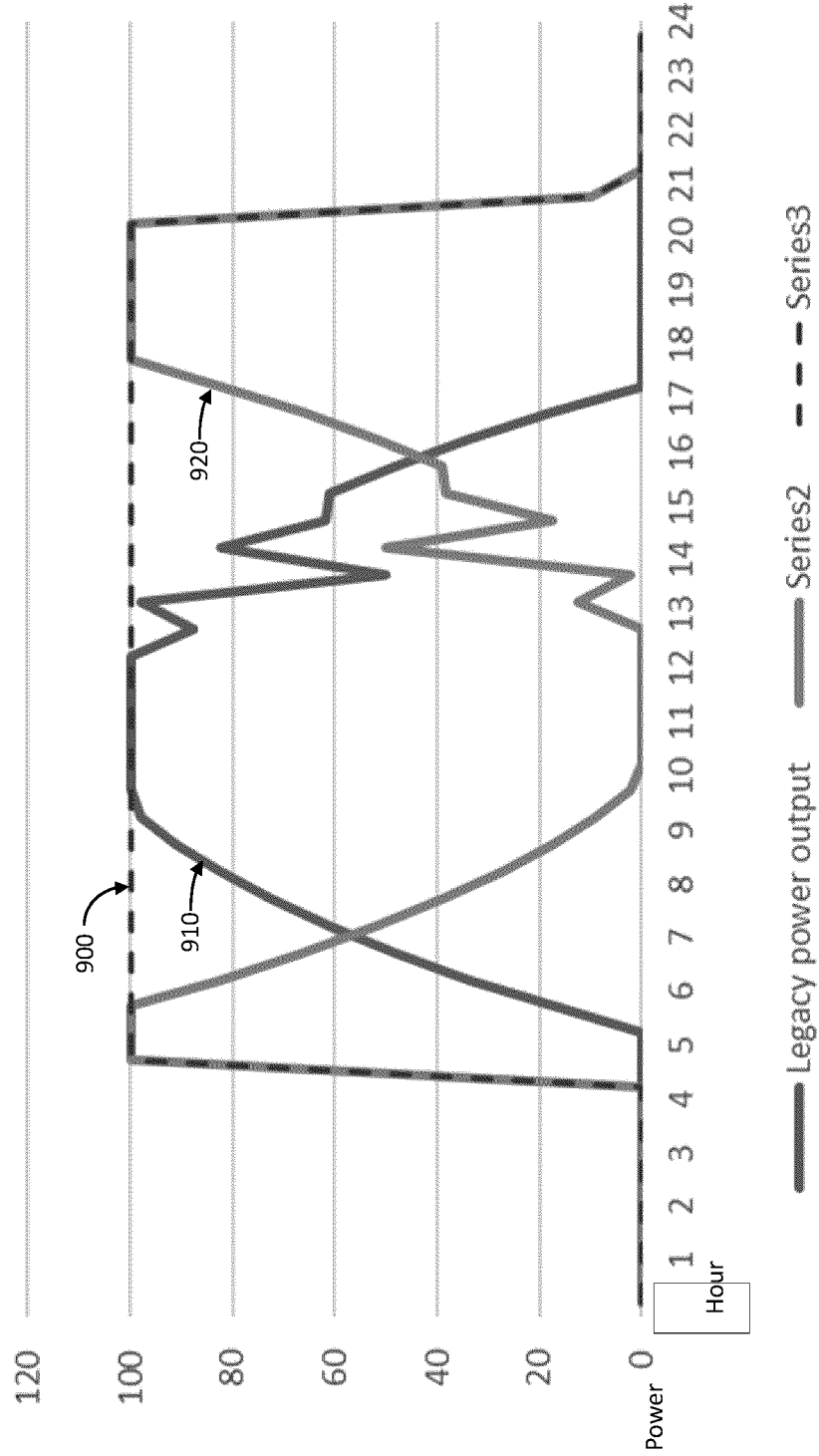
FIG. 9 is another example combined output of an example ARPP and an example LRPP, in accordance with one or more embodiments.

FIG. 9 is another example combined output 900 of an example ARPP and an example LRPP, in accordance with one or more embodiments. FIG. 9 may show a combined output 900 for the ARPP and LRPP of FIG. 8 for a day when the LRPP output 910 is inconsistent. FIG. 9 may show a combined output 900 for the ARPP and LRPP of FIGS. 2-4 for a day when the LRPP output 910 is inconsistent. The LRPP output 910 may be inconsistent due to clouds passing over the solar array of the LRPP, due to maintenance, or other factors. The ARPP output 920 may be adjusted in real time to complement the LRPP output 910, as described herein. The combined output 900 may not be consistent for the entire time interval of 4:00 to 21:00 as it was in FIG. 8. The combined output 900 may have a priority to maintain consistent output for as long as possible or to maintain consistent output for the time interval as consistently as possible. FIG. 9 shows the combined output 900 having a priority to maintain consistent output for as long as possible, maintaining the combined output 900 at peak output until shortly before 21:00.

In an example, afternoon clouds disrupt the LRPP output 910 between noon and 2:00 pm and between 3:00 pm and 4:00 pm. The ARPP output 920 may increase to offset the reduced output of the LRPP. The ARPP output 920 may be able to be increase because the ARPP has greater output capacity than the LRPP and the ARPP includes an ESS having stored energy. The ARPP output 920 may be reduced due to the clouds as well, meaning that the ESS of the ARPP is fully discharged earlier than it would be if the ARPP output 920 were not affected by the clouds. However, total power production remains steady through the afternoon and early evening. This is advantageous because a grid operator may be alerted to the reduced ARPP output 920 and LRPP output 910 and may plan for additional power output from other sources to be used once the ARPP ESS is fully depleted.

Figure 10:
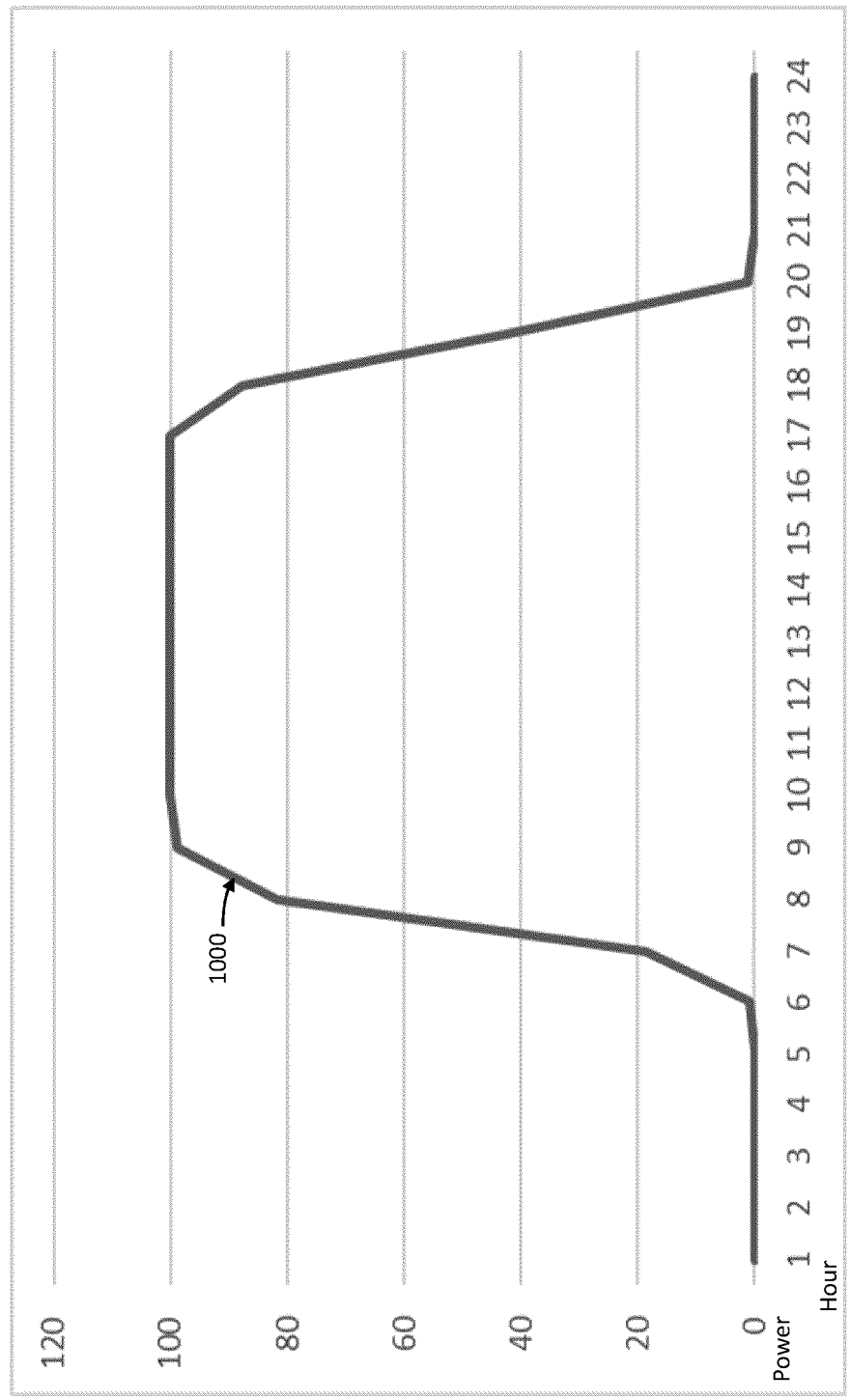
FIG. 10 is another example output of an example LRPP, in accordance with one or more embodiments.

FIG. 10 is another example output 1000 of an example LRPP, in accordance with one or more embodiments. The LRPP output 1000 is an output of an LRPP having a solar array incorporating solar trackers. The solar trackers allow the LRPP output 1000 to rise earlier and reach the peak output earlier in the day, as compared to the output 700 of FIG. 7.

Figure 11:
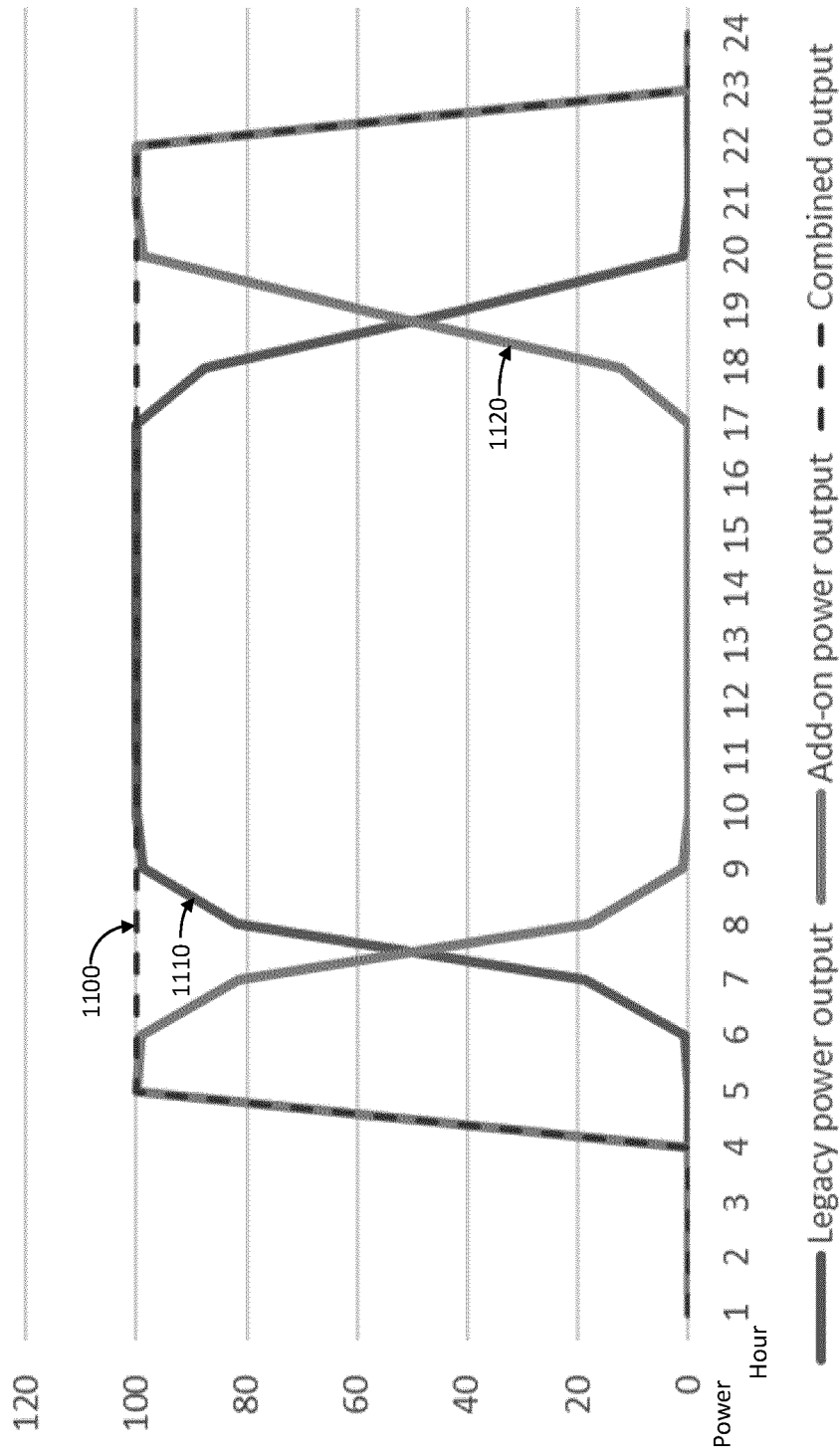
FIG. 11 is yet another example combined output of an example ARPP and an example LRPP, in accordance with one or more embodiments.

FIG. 11 is yet another example combined output 1100 of an example ARPP and an example LRPP, in accordance with one or more embodiments. The combined output 1100 is a combination of an LRPP output 1110 and an ARPP output 1120. The LRPP output 1110 may be the LRPP output 1000 of FIG. 10. The ARPP output 1120 may complement the LRPP output 1110, as described herein. Due to the increased LRPP output 1110, the combined output 1100 may be consistent for longer than the combined output 800, about 4:00 to 23:00.

In an illustrative embodiment, any of the operations described herein can be implemented at least in part as computer-readable instructions stored on a computer-readable memory. Upon execution of the computer-readable instructions by a processor, the computer-readable instructions can cause a node, such as a computing node or a power plant node, to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An add-on renewable power plant (ARPP) comprising:
a renewable energy source (RES) connected to a legacy renewable power plant (LRPP) interconnection infrastructure, wherein an output capacity of the RES is sized based on an LRPP interconnection infrastructure transmission capacity and an LRPP power output profile, the LRPP interconnection infrastructure transmission capacity indicating a maximum amount of energy that can be transmitted from the LRPP to a grid;
an energy storage system (ESS) connected to the LRPP interconnection infrastructure, wherein a storage capacity of the ESS is sized based on the LRPP interconnection infrastructure transmission capacity and the LRPP power output profile; and
an ARPP controller operatively coupled to an RES inverter coupled to the RES and a bidirectional ESS inverter coupled to the ESS, the ARPP controller configured to:
receive an indication of an LRPP power output from an LRPP controller, wherein the LRPP controller adjusts inverter setpoints for an LRPP RES independent of the ARPP controller;
calculate a difference based on the LRPP infrastructure transmission capacity and the indication of the LRPP power output; and
responsive to the received indication of the LRPP power output, directly adjust an RES inverter setpoint of the RES inverter and directly adjust an ESS inverter setpoint of the bidirectional ESS inverter, wherein the RES inverter setpoint and the ESS inverter setpoint are selected to direct, from the RES inverter and the ESS inverter, power substantially equal to the calculated difference to the grid.

2. The ARPP of claim 1, wherein the controller is further configured to track the ARPP power output and the LRPP power output.

3. The ARPP of claim 1, wherein the controller is further configured to control the ARPP such that the ARPP power output complements the LRPP power output.

4. The ARPP of claim 1, wherein the RES output capacity and the ESS storage capacity are tuned based on the LRPP transmission capacity and the LRPP power output profile.

5. The ARPP of claim 4, wherein the RES output capacity and the ESS storage capacity are tuned such that an ARPP-LRPP combined power output capacity is greater than or substantially equal to the LRPP interconnection infrastructure transmission capacity.

6. The ARPP of claim 5, wherein the RES output capacity and the ESS storage capacity are tuned such that the RES is capable of charging the ESS with a sufficient amount of power such that the ESS is capable of outputting an amount of power substantially equal to the transmission capacity of the LRPP interconnection infrastructure.

7. The ARPP of claim 1, wherein the controller is further configured to track the ARPP-LRPP combined power output using a meter in a gen-tie of the interconnection infrastructure.

8. The ARPP of claim 1, wherein the ARPP is connected to the LRPP interconnection infrastructure upstream of an LRPP transformer.

9. The ARPP of claim 1, wherein the ARPP is connected to the LRPP interconnection infrastructure downstream of an LRPP transformer.

10. The ARPP of claim 1, wherein the RES is a solar array.

11. A method comprising:
determining a renewable energy source (RES) output capacity and an energy storage system (ESS) storage capacity based on a transmission capacity of a legacy renewable power plant (LRPP) interconnection infrastructure and a power output profile of the LRPP, wherein the LRPP interconnection infrastructure transmission capacity is a maximum amount of energy that can be transmitted from the LRPP to a grid; and
constructing an add-on renewable power plant (ARPP) including an RES having the determined RES output capacity, an ESS having the determined ESS storage capacity, and an ARPP controller configured to calculate a difference based on the transmission capacity of the LRPP interconnection infrastructure and an indication of an LRPP power output received from an LRPP controller, and directly adjust a setpoint of the RES and a setpoint of the ESS, such that the RES and the ESS direct, to the grid, power substantially equal to the difference, wherein the LRPP controller adjusts inverter setpoints of an LRPP RES independent of the ARPP controller, and wherein the ARPP is configured to connect to the LRPP interconnection infrastructure.

12. The method of claim 11, further comprising measuring an ARPP power output and an LRPP power output.

13. The method of claim 12, further comprising controlling the ARPP such that an ARPP-LRPP combined power output does not exceed the transmission capacity of the LRPP interconnection infrastructure.

14. The method of claim 12, further comprising controlling the ARPP such that the ARPP power output complements the LRPP power output.

15. The method of claim 14, wherein determining the RES output capacity and the ESS storage capacity includes determining the RES output capacity and the ESS storage capacity such that an ARPP-LRPP combined power output is substantially equal to the transmission capacity of the LRPP interconnection infrastructure.

16. The method of claim 12, further comprising measuring an ARPP-LRPP combined power output using a meter in a gen-tie of the interconnection infrastructure.

17. The method of claim 11, wherein the ARPP is configured to connect to the LRPP interconnection infrastructure upstream of an LRPP transformer.

18. The method of claim 11, wherein the ARPP is configured to connect to the LRPP interconnection infrastructure downstream of an LRPP transformer.

19. The method of claim 11, wherein determining the RES output capacity includes determining a type of renewable energy utilized by the RES.

20. A method comprising:
calculating, by an add-on renewable power plant (ARPP) controller, a difference based on a legacy renewable power plant (LRPP) interconnection infrastructure transmission capacity and an indication of an LRPP power output received from an LRPP controller, wherein the LRPP controller adjusts inverter setpoints for an LRPP RES independent of the ARPP controller based on the LRPP power output, the LRPP power output indicating an amount of power the LRPP is currently outputting;
directly adjusting, by a controller of an add-on renewable power plant (ARPP), a renewable energy source (RES) inverter setpoint of an RES inverter coupled to an RES of the ARPP and directly adjusting, by the ARPP controller, an energy storage system (ESS) inverter setpoint of an ESS inverter coupled to an ESS of the ARPP to control an ARPP output to be substantially equal to the difference, wherein the ARPP is connected to the LRPP interconnection infrastructure, and wherein an output capacity of the RES is sized based on the LRPP interconnection infrastructure transmission capacity and an LRPP power output profile, and a storage capacity of the ESS is sized based on the LRPP interconnection infrastructure transmission capacity and the LRPP power output profile.

* * * * *